R. Comins,
Truss Bridge.
No. 1884. Reissued Feb. 28. 1865.
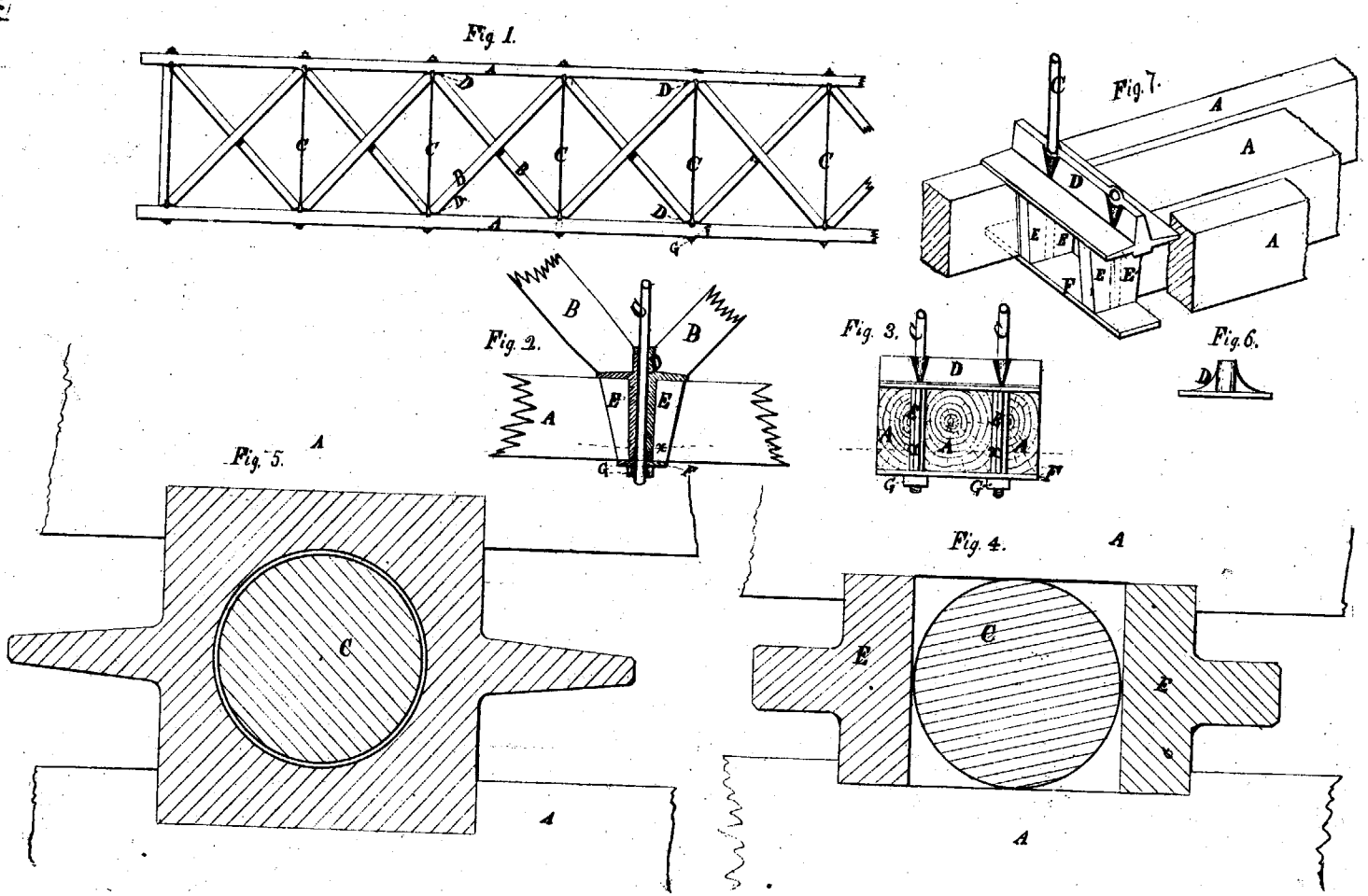
Witnesses
Marcus P. Norton
Chas. D. Kellum
Reuben Comins.
N. PETERS, PHOTO-LITHOGRAPHER, WASHINGTON, D. C.

UNITED STATES PATENT OFFICE.

REUBEN COMINS, OF TROY, NEW YORK.

IMPROVEMENT IN TRUSS-BRIDGES.

Specification forming part of Letters Patent No. 16,579, dated February 10, 1857; Reissue No. 1,884, dated February 28, 1865.

*To all whom it may concern:*

Be it known that I, REUBEN COMINS, of the city of Troy, county of Rensselaer, and State of New York, have invented new and useful Improvements in Metal Shoes for Truss-Frames of Bridges, Roots, &c.; and I do hereby declare that the following is a full, clear, and exact description of the same, reference being hereby had to the accompanying drawings, which form a part of this specification.

Like letters represent and refer to like or corresponding parts.

Figure 1 is a vertical view or side elevation of a truss-frame for one side of a bridge with my improvements herein described applied thereto. Fig. 2 is a vertical longitudinal section of a portion of the same on a line of vertical rods C C and through stringers A A, and shows a cross-section of my improved shoe D D and the combination of the different parts thereof. Fig. 3 is a transverse section of the stringers, and shows a side view of my improved shoe and a section of the vertical rods passing through it, and the combination of the different parts, as in Fig. 2. Fig. 4 is a horizontal section of one side of my shoe, on the line *x x* in Figs. 2 and 3, showing bolt C and the projections E E, hereinafter more fully described. Fig. 5 is a section of the socket used with old style block instead of the shoe, and is upon the same scale of Fig. 4, both of which are upon an enlarged scale from the other figures. Fig. 6 shows the upper part of the shoe D D, against which the braces B B rest when in place. Fig. 7 is a perspective view of my improved shoe, showing its combination with all the other parts, the combination of its own parts, construction, and arrangement, as hereinafter described.

My said invention relates to that kind of shoe for bridges or for truss-frames, which at that part thereof on which the braces rest is of the form of an inverted T, or which may have an angular or curved form, and which, containing my improvement, is much better than any other kind heretofore known.

The nature of my invention consists in the employment of a shoe with projections, plates, or spurs from the surface thereof, which rests upon and against the stringers, extending through them at the point or place where the vertical rods pass through said shoes and stringers, said projections having a passage or recess between or through them, thus forming a jaw or opening for said rods to pass. These projections, plates, or spurs extend from that part of the shoe which rests upon the stringers to the washers and nuts upon the opposite side thereof, and which said projections, plates, or spurs may be formed or cast upon said shoe, or which may be made separate and detached therefrom, of the same or of other material, occupying, however, the same relative position in the truss-frame, and also the same combinations with other parts of the truss-frame, and for the same purposes as though made solid or in one piece, and which may also extend from the shoe through the stringers to the washers and nuts, as herein provided.

It is evident that this shoe differs from all others for bridges or trusses now in use by its combination with the projections, plates, or spurs which extend through the stringers in the manner aforesaid, and for the purposes herein described, and which do not necessarily surround the rod, as all other plans and arrangements require. It is therefore much better for the purposes employed, as it takes up less room in passing through the stringers, affording thereby much more strength with less weight of iron or other material, which are great and essential advantages in the construction of bridges, &c., as will more fully hereinafter appear.

The said projections, plates, or spurs which extend from the side or surface of the shoe which rests upon the stringers, or which, being separate pieces, combine therewith, and, passing through said stringers to washers and nuts upon the opposite side of the said stringers, as aforesaid, may be of the same material as that of the shoe, or of any other material different therefrom which will answer the purposes required of the said projections, plates, or spurs.

To enable others skilled in the art to which my invention relates to make and use my said improvements, I will here proceed to describe the construction thereof, as well as the operation of the same.

A A represent the stringers of the truss-frame.

B B represent the diagonal braces, and C C the vertical rods, which are all of the usual construction.

D D is a metal shoe, which is similar in construction at that part where the angular ends of the braces B B rest to shoes in use, but differs from the same in general construction, as follows, to wit:

E E are the projections, plates, or spurs hereinbefore described, and are made of the material aforesaid. When made of wood, they must be of some hard, strong kind, and placed endwise or sidewise between the surface of the shoe resting upon the stringers and washers and nuts on the opposite side of said stringers, and may be constructed and occupy the same relative position as though made of iron or other metal. Wood would be much lighter, cheaper, and nearly as strong, answering, however, all the purposes required. They would pass through or between the stringers, and upon the outside of them, as the case might require, from the shoes to the washers and nuts opposite, thus forming a combination of parts or devices of great strength and durability at that point upon which the said shoe rests. The said projections, plates, or spurs E E, Figs. 2, 3, and 7, may be of any form or shape desirable, so long as they pass through the stringers to the washers, with an opening or recess between or in them for the vertical rods C C to pass through or between them, as fully shown at Figs. 2, 4, and 7.

F is the washer, which is held in its place by the nut G on the ends of the vertical rods C C. The main object of having the said projections, plates, or spurs thus combined with the said shoes is to remove the crushing force of the diagonal braces from the stringers and transferring the same directly upon the shoes and rods by the means above described, whereby all the liability of the crushing or breaking of the stringers where the pressure and strain is the greatest is wholly avoided and rendered perfectly secure.

By the use or employment of the said projections, plates, or spurs of suitable form between the shoes, washers, and nuts, and arranged so as to form jaws or openings for the vertical rods C C, with screws for said nuts thereon to pass through or between, instead of using a socket and block resting thereon, the necessity of cutting away the wood, so as to apply the same to the stringers, is partially or entirely avoided, as shown by the red lines at Fig. 5, while at the same time the pieces forming the stringers, when made of more pieces than one placed side by side, and arranged with an opening or openings, so the projections, plates, or spurs will pass between said pieces, can be brought closer together, as will be clearly seen on comparing Fig. 4 with Fig. 5 of the drawings, represented by the red lines, which is quite essential in the construction of a bridge or truss-frames generally.

My improvement herein described can be put into successful use with less weight of material than any other plan to me known or in use.

There is not as much cutting away of the stringers in order to apply my said improvement as required by all other known plans, so that the timber is thus much better preserved at that point where great strength is required and the durability of the truss-frame unimpaired. This improvement also secures and holds the diagonal braces or timbers in their places by confining their ends firmly in their proper position, so as to prevent their moving in any direction, splitting, or brooming up, which is not so successfully and effectually accomplished by any other methods now in use within my knowledge. These are important considerations in the construction of bridges for railroads, &c. There is greater strength, less weight of material, and more economy and durability in the construction of bridges, &c, according to my aforesaid improvements than in or by any other plan to me known or in use.

Having thus described my improvements in shoes and the several parts connected therewith for bridges and for truss-frames generally, what I claim, and desire to secure by Letters Patent, is—

The employment of a shoe for bridges and truss-frames which is of the inverted T, angular, or curved shape where the ends of the diagonal braces rest, in combination with the projections, plates, or spurs extending through the stringers to the washers and nuts upon the opposite side of such stringers, in the manner and for the purposes substantially as herein described and set forth.

In testimony whereof I have on this 13th day of November, A. D. 1863, hereto set my hand.

REUBEN COMINS.

Witnesses:

MARCUS P. NORTON,
CHAS. D. KELLUM.